United States Patent [19]

Imai et al.

[11] Patent Number: 4,516,105

[45] Date of Patent: May 7, 1985

[54] METAL OXIDE VARISTOR WITH NON-DIFFUSABLE ELECTRODES

[75] Inventors: Motomasa Imai; Takashi Takahashi, both of Tokyo; Osamu Furukawa, Sagamihara; Hideyuki Kanai, Kawasaki, all of Japan

[73] Assignee: Tokyo Shibaura Denki Kabushiki Kaisha, Kawasaki, Japan

[21] Appl. No.: 395,278

[22] Filed: Jul. 6, 1982

[30] Foreign Application Priority Data

Jul. 16, 1981 [JP] Japan ............................... 56-110028

[51] Int. Cl.[3] ......................... H01C 7/10; C04B 35/00

[52] U.S. Cl. ....................................... 338/21; 338/20; 264/61; 264/66

[58] Field of Search ...................... 38/20, 21; 252/518, 252/519; 264/66, 61; 29/610 R

[56] References Cited

U.S. PATENT DOCUMENTS

| | | | |
|---|---|---|---|
| 2,791,521 | 5/1957 | Jaffe . | |
| 3,611,073 | 10/1971 | Hamamoto et al. . | |
| 3,670,216 | 6/1972 | Masuyama et al. . | |
| 3,863,193 | 1/1975 | Matsura et al. | 338/21 |
| 3,899,451 | 8/1975 | Ichinose et al. | 338/21 |
| 3,999,159 | 12/1976 | Matsura et al. | 338/21 |
| 4,042,535 | 8/1977 | May . | |
| 4,045,374 | 8/1977 | Nagasawa et al. . | |
| 4,046,847 | 9/1977 | Kresge | 264/61 |
| 4,165,351 | 8/1979 | May | 264/66 |
| 4,243,622 | 1/1981 | Kresge | 264/66 |

FOREIGN PATENT DOCUMENTS

| | | | |
|---|---|---|---|
| 0029749 | 6/1981 | European Pat. Off. | 338/21 |
| 52-61787 | 5/1977 | Japan . | |
| 5150202 | 5/1979 | Japan | 338/21 |
| 5150203 | 11/1980 | Japan | 338/21 |
| 56-22123 | 5/1981 | Japan . | |

OTHER PUBLICATIONS

*Handbook of Thick Film Technology,* Electrochemical Pub. Limited, Glascow, G.B., ©1976, P. J. Holmes and R. G. Loasby, pp. 186–190.

*Integrated Circuit Fabrication,* McGraw-Hill Book Co., New York, ©1982, David J. Elliot, pp. 18–20.

*Primary Examiner*—Roy N. Envall, Jr.

*Assistant Examiner*—C. N. Sears

*Attorney, Agent, or Firm*—Schwartz, Jeffery, Schwaab, Mack, Blumenthal & Koch

[57] ABSTRACT

Disclosed is a metal oxide varistor which comprises; a sintered body containing (a) ZnO as a principal component, and (b), as auxiliary components, Bi, Co and Mn in amounts of 0.05∼2 mole %, 0.05∼2 mole % and 0.05∼2 mole %, when calculated in terms of $Bi_2O_3$, $Co_2O_3$ and $MnO_2$, respectively, and at least one selected from Al, In and Ga in amounts of $1\times10^{-4}\sim3\times10^{-2}$ mole %, when calculated in terms of $Al_2O_3$, $In_2O_3$ and $Ga_2O_3$, respectively; said sintered material having been reheated at a temperature of 650°∼900° C. after sintering; and a non-diffusible electrode provided on said sintered body. The metal oxide varistor has excellent pulse response and volt-ampere non-linearity even with respect to a pulse having a short rise time of less than a microsecond.

10 Claims, 5 Drawing Figures

METAL OXIDE VARISTOR WITH NON-DIFFUSABLE ELECTRODES

BACKGROUND OF THE INVENTION

This invention relates to a varistor made of an oxide-semiconductor.

As an element for circuit to which a semiconductor is applied, there has been used a varistor (i.e., a resistor whose resistance varies non-linearly relative to the applied voltage). Typically, a varistor composed of a sintered ZnO to which various kinds of oxides are added, has been known to the art. This kind of varistor has non-linear volt-ampere characteristic, that is to say, its resistance decreases abruptly with the rise of the voltage so that the current increases remarkably. Therefore, such varistor has been practically used for the purpose of absorbing abnormal voltage and stabilizing voltage.

The performance of a varistor is generally evaluated by the volt-ampere characteristic represented approximately by the following equation:

$$I = \left(\frac{V}{C}\right)\alpha$$

wherein I is the current flowing in the varistor; V is an applied electromotive force (voltage); C is a constant; and $\alpha$ is a non-linearity coefficient.

Accordingly, the general performance of a varistor can be indicated by the two constants of C and $\alpha$, and usually is indicated by voltage $V_1$ at 1 mA in place of C.

While the above-mentioned ZnO-system varistor has many advantages such that its volt-ampere characteristic can be controlled optionally, it has such a drawback in cases where it is used for providing a pulse whose rise time is short. That is, the conventional ZnO-system varistor has been disadvantageous in that the absorbability of an overvoltage in a pulse of a short rise time is so extremely lowered that it can not perform a function which has been of great account in a varistor. Such a phenomenon is considered to occur for the following reasons:

In general, when an overvoltage is applied, the varistor absorbs the overvoltage by conducting a current corresponding to the voltage. However, the response current (the pulse response) which has resulted by the application of a stepwise voltage to a conventional ZnO-system varistor changed characteristically with the time lapse. More specifically, the charging current which varies depending upon the capacitance of the ZnO-system varistor flows at first, and then the current, after reaching a peak, decreases exponentially relative to the lapse of time, and thereafter the current inherent to the ZnO-system varistor increases gradually at a time constant of from several to several tens of microseconds to converge on the current value as indicated by the afore-mentioned equation of the volt-ampere characteristic.

In other words, the current of the conventional ZnO-system varistor is extremely limited over a time range of several microseconds immediately after application of a voltage. With respect to the overvoltage pulse of a short rise time, the sufficient current does not flow in such a varistor during the time range mentioned above, whereby the overvoltage-absorbability is extremely lowered.

Recently, attempts have been made to improve the pulse response as disclosed in Japanese Laid-Open patent application Nos. 61789/1977 and 22123/1981. However, none of them show pulse response and non-linearity sufficient for practical use.

SUMMARY OF THE INVENTION

In view of the foregoing points, this invention aims to provide a metal oxide varistor which shows excellent non-linearity even with respect to an overvoltage pulse having a short rise time and is capable of absorbing surely the overvoltage pulse.

According to this invention, there is provided a metal oxide varistor which comprises; a sintered body containing (a) ZnO as a principal component, and (b), as auxiliary components, Bi, Co and Mn in amounts of 0.05~2 mole %, 0.05~2 mole % and 0.05~2 mole %, when calculated in terms of $Bi_2O_3$, $Co_2O_3$ and $MnO_2$, respectively, and at least one selected from Al, In and Ga in amounts of $1\times10^{-4}\sim3\times10^{-2}$ mole %, when calculated in terms of $Al_2O_3$, $In_2O_3$ and $Ga_2O_3$, respectively; said sintered material having been reheated at a temperature of 650°~900° C. after sintering; and a non-diffusible electrode provided on said sintered body.

DETAILED DESCRIPTION OF PREFERRED EMBODIMENTS

The non-diffusible electrode is hereby meant an electrode which has a property that any component thereof does not diffuse into the sintered body when the electrode is formed thereon, so that the electrode will not adversely affect the state of electrons in the sintered body desirable for improving the pulse response, etc.

This invention is to provide a varistor which can surely absorb an overvoltage pulse having the rise time of less than a microsecond and can further improve the volt-ampere non-linearity when the following three conditions are met:

(1) a ZnO-system sintered body having such a composition as specified above, which shows the volt-ampere non-linearity, is employed;

(2) this ZnO-system sintered body is heated again at a temperature of 650°~900° C.; and (3) a non-diffusible electrode is used.

The above three conditions are explained below in more detail:

(1) In this invention, the sintered body is composed of (a) ZnO as a principal component and (b), as auxiliary components, Bi, Co and Mn in amounts of 0.05~2 mole %, 0.05~2 mole % and 0.05~2 mole %, when calculated in terms of $Bi_2O_3$, $Co_2O_3$ and $MnO_2$, respectively, and at least one selected from Al, In and Ga in amounts of $1\times10^{-4}\sim3\times10^{-2}$ mole %, when calculated in terms of $Al_2O_3$, $In_2O_3$ and $Ga_2O_3$, respectively. Of these components, the auxiliary components Bi, Co and Mn are elements necessary for attaining the desired volt-ampere non-linearity. The contents thereof have been specified as above since otherwise the volt-ampere non-linearity will be lowered.

The other auxiliary components Al, In and Ga are considered to dissolve in ZnO grains in a solid state to form a large amount of donors. The reason why the content of at least one of these is specified to be $1\times10^{-4}\sim3\times10^{-2}$ mole %, when calculated in terms of $Al_2O_3$, $In_2O_3$ and $Ga_2O_3$, respectively, is that the pulse response will not be improved remarkably if it is less than $1\times10^{-4}$ mole % and the non-linearity sufficient for practical use will not be obtained if it exceeds $3\times10^{-2}$ mole %.

Even if the content of Bi, Co and Mn is varied as occasion demands, the short overvoltage pulse can be surely absorbed so far as other conditions are met. In addition to the above components, Sb, Mg, Ni and the like may further be incorporated if necessary, in amounts of $0.1\sim3$ mole %, $0.1\sim15$ mole % and $0.05\sim2$ mole % when calculated in terms of $Sb_2O_3$, MgO and NiO, respectively.

(2) It is for the purpose of converting the α- or β-form into the γ-form of the crystal structure of $Bi_2O_3$ layers formed at the boundaries of ZnO grains that the ZnO-system sintered body having the above composition is reheated at 650°~900° C. in this invention. The reason why the reheating temperature is set to be 650°~900° C. is that the voltage build up ratio will be extremely raised if it is less than 650° C. or exceeds 900° C. The most preferable results are obtainable by reheating at a temperature of 700°~870° C.

It is understood that, according to this invention, the pulse response has been improved remarkably by selecting the composition, especially by incorporating the specific amounts of $Al_2O_3$, $In_2O_3$ and/or $Ga_2O_3$ to alter the electronic state of the ZnO grains per se, as mentioned in the above (1), and by further reheating at a specific temperature to change the electronic state of the $Bi_2O_3$ at the grain boundary phase as mentioned in the above (2).

(3) The non-diffusible electrode is to be used in this invention; this is because, if ordinary electroconductive paste such as Ag paste is baked after printing, frit components in the electroconductive paste (e.g., borosilicate glass, $Bi_2O_3$, etc.) diffuse into the sintered body to adversely affect the state of electrons in said sintered body desirable for the purpose of improving the pulse response and the non-linearity in this invention.

Accordingly, the non-diffusible electrode to be used in this invention hereby means, as already mentioned, such an electrode that will not adversely affect the electronic state of the sintered body, and there may be used practically a paste electrode baked at such a temperature that may not cause the diffusion of frit components into the sintered body, an electrode provided by flame-spraying of Al or the like metal, an electrode provided by vapor deposition or sputtering of Al or the like, or an electrode provided by electroless plating of Ni or the like.

As explained above, a varistor having remarkably improved pulse response and excellent volt-ampere non-linearity is obtainable by producing a metal oxide varistor which has met the above-mentioned three conditions.

BRIEF DESCRIPTION OF DRAWINGS

Now, this invention will be explained in more detail by Examples and Comparative Examples, with reference to the accompanying drawings, which drawings show the characteristics of the metal oxide varistor according to this invention, in which.

EXAMPLE 1

To a basic composition comprising ZnO mixed with $Bi_2O_3$, $Co_2O_3$, MnO, $Sb_2O_3$, MgO and NiO in amounts of 0.5 mole %, 0.5 mole %, 0.5 mole %, 1 mole %, 5 mole % and 0.2 mole %, respectively, further added and mixed was at least one of $Al_2O_3$, $In_2O_3$, and $Ga_2O_3$ in amounts of $1\times10^{-4}\sim3\times10^{-2}$ mole %, which were then wet-blended thoroughly in a ball mill, and dried to obtain a powdery preparation. The powdery preparation thus obtained was mixed with poly(vinyl alcohol) as a binder, the resultant mixture was molded at a pressure of 1 ton/cm² to make molded bodies of 20.0 mm in diameter and 1 mm in thickness, followed by being sintered at a temperature of 1200° C. to obtain sintered bodies. These sintered bodies were reheated at 800° C. in atomosphere of air, and then polished in parallel at their both surfaces, to which polished surfaces provided were electrodes by flame-spraying of Al to obtain metal oxide varistors according to the invention.

Figure 1:
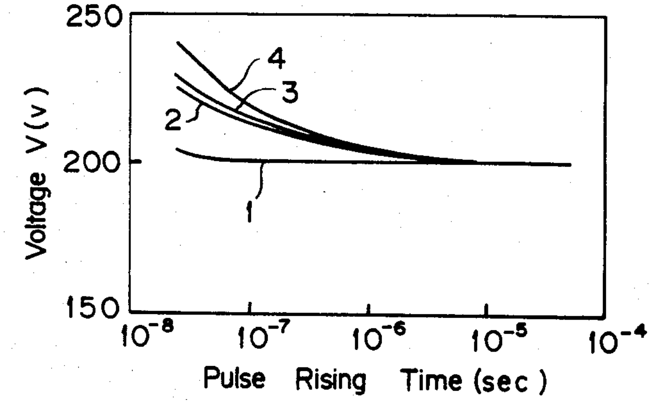
FIG. 1 illustrates curves showing the relationship between pulse-rise time and voltage.

Pulse response of one of the metal oxide varistors thus obtained was indicated by $V_{0.1A}$ which was the voltage produced when pulse voltages of varied rise time were applied and current of 0.1 A was allowed to flow into the element, and is shown in FIG. 1. In FIG. 1, Curve 1 concerns the varistor according to this invention, which was prepared by adding to the basic composition $1\times10^{-3}$ mole % of $Al_2O_3$ and reheating at 800° C. Curve 2 concerns a varistor obtained in the same manner as in the varistor of Curve 1 except for reheating; Curve 3 concerns a varistor obtained in the same manner as in the varistor of Curve 1 except for addition of $Al_2O_3$; and Curve 4 concerns a varistor obtained in the same manner as in the varistor of Curve 1 except for addition of $Al_2O_3$ and reheating. Curves 2 to 4 each show the results of Comparative Examples.

As apparent from FIG. 1, the varistor according to this invention has been remarkably improved in its pulse response even to a pulse having a short rise time of less than a microsecond. In contrast thereto, the varistors of the Comparative Examples where each of the addition of $Al_2O_3$ and the reheating was carried out independently, have been improved only slightly in their pulse response so that the performances were not sufficient.

Figure 2:
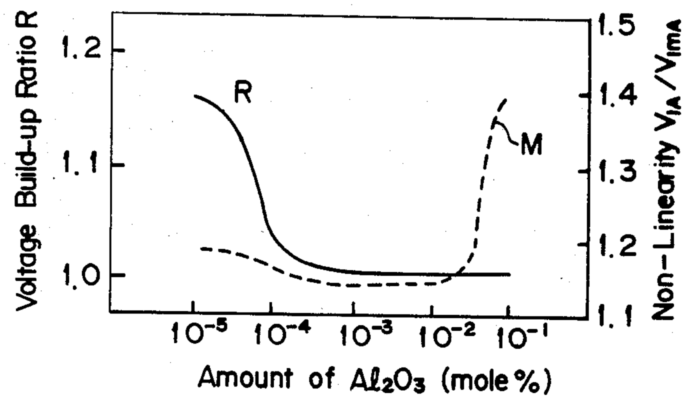
FIGS. 2, 4 and 5 illustrate curves showing voltage build up ratios and non-linearities relative to the contents of $Al_2O_3$, $In_2O_3$ and $Ga_2O_3$, respectively.

FIG. 2 shows relationship between the content of $Al_2O_3$ and the pulse response, which the latter is herein indicated as a ratio R of the voltage $V_{0.1A\,(5\times10^{-8})}$ caused by the application of a pulse having a rise time of $5\times10^{-8}$ sec and the voltage $V_{0.1A\,(1\times10^{-5})}$ caused by the application of a pulse having a rise time of $1\times10^{-5}$ sec;

$$R = V_{0.1A\,(5\times10^{-8})}/V_{0.1A\,(1\times10^{-5})}$$

and R herein represents voltage build up ratio between voltages caused by the pulses as applied having different rise times; the more approximately R approaches 1, the better the pulse response is.

The curve represented by a full line in FIG. 2 concerns an Example according to this invention, where the reheating was carried out at a temperature of 800° C. As apparent from FIG. 2, remarkable improvement of the pulse response may be observed when the $Al_2O_3$ content exceeds $1\times10^{-4}$ mole %.

Further, non-linearity is also shown in FIG. 2. The non-linearity is represented by $V_{1A}/V_{1mA}$ which is a ratio of the voltages $V_{1A}$ caused when the current of 1 A was allowed to flow in the element and $V_{1mA}$. It is seen from the curve represented by a dashed line in FIG. 2 that the non-linearity has also been improved by the addition of $Al_2O_3$.

Figure 3:
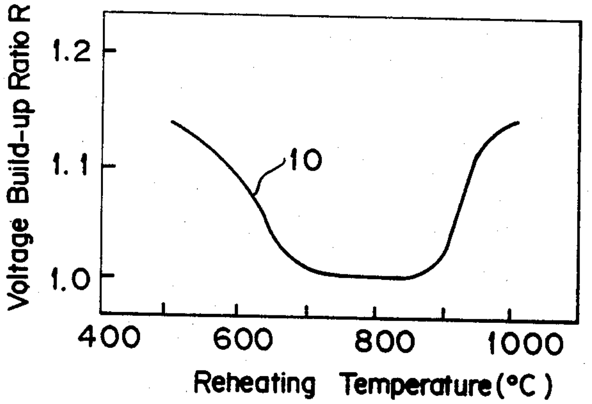
FIG. 3 illustrates curves showing the relationship between reheating temperature and voltage build up ratio.

Relationship between reheating temperature and pulse response is shown in FIG. 3, in which the pulse response is indicated by voltage build up ratio R in the same manner as in FIG. 2. Curve 10 shown in FIG. 3 concerns the element prepared by adding $1\times10^{-3}$ mole % of $Al_2O_3$ to the basic composition. It is seen therefrom that the pulse response has been improved remarkably by reheating at 650° ~ 900° C., more preferably at 700° ~ 870° C.

Figure 4:
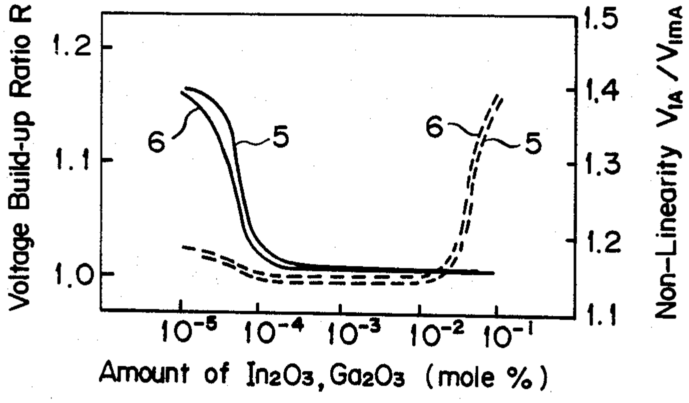

Similarly, relationship between the content of $In_2O_3$ or $Ga_2O_3$ and the pulse response is shown in FIG. 4. In FIG. 4, Curve 5 concerns the case where $In_2O_3$ was added and Curve 6 concerns the case where $In_2O_3$ was added, as shown by the curves represented by full lines, respectively. In addition, the manner of change in the volt-ampere non-linearity $V_{1A}/V_{1mA}$ is also shown by dashed line.

Figure 5:
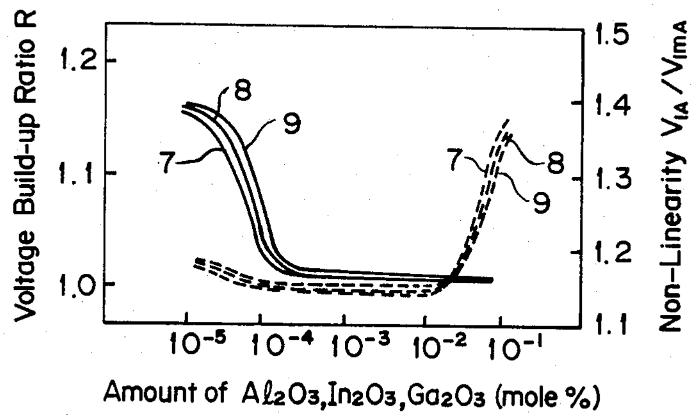

FIG. 5 likewise shows the relationship between the added amount of the mixture of two or more of $Al_2O_3$, $In_2O_3$ and $Ga_2O_3$ and the pulse response as well as the relationship between the former and the volt-ampere non-linearity. Curve 7 concerns the case where $Al_2O_3$ and $Ga_2O_3$ were mixed respectively in equimolar proportion, Curve 8 concerns the case where $Al_2O_3$ and $In_2O_3$ were mixed respectively in equimolar proportion, and Curve 9 concerns the case where the three of $Al_2O_3$, $In_2O_3$ and $Ga_2O_3$ were mixed respectively in equimolar proportion.

As apparent from FIGS. 2, 4 and 5, the pulse response has remarkably been improved and the non-linearity has also been improved when each of $Al_2O_3$, $In_2O_3$ and $Ga_2O_3$ was independently added to the basic composition or when they were added thereto in combination.

EXAMPLE 2

To each of the basic compositions comprising ZnO mixed with $Bi_2O_3$, $Co_2O_3$ and MnO in amounts of 0.05 ~ 2 mole %, 0.05 ~ 2 mole % and 0.05 ~ 2 mole %, respectively, and optionally with $Sb_2O_3$, MgO and NiO in amounts of 0.1 ~ 3 mole %, 0.1 ~ 15 mole % and 0.05 ~ 2 mole %, respectively, there was added at least one of $Al_2O_3$, $In_2O_3$ and $Ga_2O_3$ in an amount of $1\times10^{-3}$ mole % (Sample Nos. 1 ~ 26 in Table 1), and the resultant mixtures were sintered to prepare sintered bodies, which were then reheated at a temperature of 800° C. Experiments were carried out under the same conditions as in Example 1, whereby the data as shown in Table 1, including those of Comparative Examples, were obtained on the performances of metal oxide varistors.

TABLE 1

| Sample No. | Composition (mole %) | | | | | | | | | | Voltage build up ratio R | Non-linearity $V_{1A}/V_{1mA}$ |
|---|---|---|---|---|---|---|---|---|---|---|---|---|
| | ZnO | $Bi_2O_3$ | $Co_2O_3$ | MnO | $Sb_2O_3$ | MgO | NiO | $Al_2O_3$ | $In_2O_3$ | $Ga_2O_3$ | | |
| 1 | Balance | 0.05 | 0.5 | 0.5 | — | — | — | $1 \times 10^{-3}$ | — | — | 1.01 | 1.23 |
| 2 | " | 0.5 | " | " | — | — | — | " | — | — | " | 1.18 |
| 3 | " | 0.5 | " | " | — | — | — | $5 \times 10^{-4}$ | $5 \times 10^{-4}$ | — | " | 1.18 |
| 4 | " | 0.5 | " | " | — | — | — | — | " | $5 \times 10^{-4}$ | " | 1.18 |
| 5 | " | 0.5 | " | " | — | — | — | $5 \times 10^{-4}$ | — | " | " | 1.18 |
| 6 | " | 0.5 | " | " | — | — | — | $3 \times 10^{-4}$ | $3 \times 10^{-4}$ | $3 \times 10^{-4}$ | " | 1.18 |
| 7 | " | 2 | " | " | — | — | — | $1 \times 10^{-1}$ | — | — | " | 1.24 |
| 8 | " | 0.5 | 0.05 | " | — | — | — | — | $1 \times 10^{-3}$ | — | 1.02 | 1.23 |
| 9 | " | " | 2 | " | — | — | — | — | " | — | " | 1.24 |
| 10 | " | " | 0.5 | 0.05 | — | — | — | — | — | $1 \times 10^{-3}$ | 1.01 | 1.24 |
| 11 | " | " | " | 2 | — | — | — | — | — | " | " | 1.23 |
| 12 | " | " | " | 0.5 | 0.1 | 0.5 | 0.5 | $1 \times 10^{-3}$ | — | — | " | 1.16 |
| 13 | " | " | " | " | 0.5 | " | " | " | — | — | " | 1.14 |
| 14 | " | " | " | " | 3 | " | " | " | — | — | " | 1.14 |
| 15 | " | " | " | " | 1 | 0.1 | " | — | $1 \times 10^{-3}$ | — | " | 1.16 |
| 16 | " | " | " | " | 1 | 1 | " | — | " | — | 1.02 | 1.15 |
| 17 | " | " | " | " | " | 10 | " | — | " | — | " | 1.14 |
| 18 | " | " | " | " | 1.0 | 15 | " | — | " | — | " | 1.17 |
| 19 | " | " | " | " | " | 5 | 0.1 | — | — | $1 \times 10^{-3}$ | 1.01 | 1.14 |
| 20 | " | " | " | " | " | " | " | — | — | " | " | 1.16 |
| 21 | " | 0.05 | " | " | " | " | 0.2 | $1 \times 10^{-3}$ | — | — | " | 1.20 |
| 22 | " | 2 | " | " | " | " | " | " | — | — | " | 1.22 |
| 23 | " | 0.5 | 0.05 | " | " | " | " | — | $1 \times 10^{-3}$ | — | 1.02 | 1.21 |
| 24 | " | " | 2 | " | " | " | " | — | " | — | " | 1.22 |
| 25 | " | " | 0.5 | 0.05 | " | " | " | — | — | $1 \times 10^{-3}$ | 1.01 | 1.23 |
| 26 | " | " | " | 2 | " | " | " | — | — | " | " | 1.21 |
| Comparative Example | " | " | " | 0.5 | — | — | — | — | — | — | 1.18 | 1.26 |

As apparent from Table 1, it is seen that the same results as those of Example 1 which, as already explained, are shown in FIGS. 1 ~ 5 were also obtained from Example 2 with respect to the pulse response represented by the voltage build up ratio R and the non-linearity represented by $V_{1A}/V_{1mA}$.

According to this invention, the effect of the invention can be always expected even when the basic composition comprises ZnO as a principal component and the amounts of $Bi_2O_3$, $Co_2O_3$ and MnO are varied in the range of 0.05 ~ 2 mole %, 0.05 ~ 2 mole % and 0.05 ~ 2 mole %, respectively, if at least one of the predetermined amount of $Al_2O_3$, $In_2O_3$ and $Ga_2O_3$ is added to and mixed with the same, which are then sintered, followed by reheating at a temperature of 650° C. ~ 950° C. It is further apparent from Examples 1 and 2 that the effect of the invention is exerted also by adding, as occassion demands, to the basic composition such additives as MgO and NiO.

Influence of the non-diffusible electrode to be used in this invention will be explained below:

First, a sintered body was obtained from the aforesaid Sample No. 13 in the same manner as in the foregoing Example 1. After a Ag paste was coated on the resultant sintered body, baking of the Ag electrode as well as the reheating of the sintered body per se was carried out at 700° C. (Sample No. 31).

Further, a sintered material likewise prepared was subjected to reheating at 700° C. and thereafter Ag paste was printed thereon, which was then baked at 600° C. (Sample No. 13).

The voltage build up ratios R of these Samples 31 and 13 are shown in Table 2.

TABLE 2

| Sample No. | Voltage build up ratio |
|---|---|
| 31 | 1.13 |
| 13 | 1.01 |

As apparent from these results, in the Sample 31 subjected to heating at 700° C., frit components in the Ag paste have diffused into the sintered body, thereby blocking the effect of the invention. Contrary thereto, an excellent effect has been obtained by the metal oxide varistor of this invention which was baked at 600° C. and caused no diffusion of the frit components.

In the above, exhibited is the case where the non-diffusible electrode was prepared by baking an electroconductive paste at a low temperature that may not cause the diffusion of frit components. However, like effect is obtainable also in cases where an electrode obtained by flame-spraying of Al or the like metal, an electrode obtained by vapor-deposition of Al or the like, an electrode obtained by sputtering of Al or the like and an electrode obtained by electroless plating of Ni or the like are employed.

As described above, it can be said that the metal oxide varistor according to this invention has pulse response as well as non-linearity excellent enough to be applicable to a pulse having a short rise time of less than a microsecond.

We claim:

1. A metal oxide varistor which comprises (1) a sintered body containing (a) ZnO as a principal component, (b) Bi, Co and Mn each in amounts of about 0.05 to about 2 mole %, when calculated in terms of $Bi_2O_3$, $Co_2O_3$ and $MnO_2$, respectively, and (c) at least one selected from Al, In and Ga in amounts of about $1\times10^{-4}$ to about $3\times10^{-2}$ mole %, when calculated in terms of $Al_2O_3$, $In_2O_3$ and $Ga_2O_3$, respectively, said sintered body having been reheated at a temperature of about 700° to about 900° C. after sintering; and (2) a non-diffusible electrode provided on said sintered body after reheating of said sintered body.

2. The metal oxide varistor according to claim 1, wherein said sintered body further comprises at least one selected from the group consisting of Sb, Mg and Ni in amounts of about 0.1 to about 3 mole %, about 0.1 to about 15 mole % and about 0.05 to about 2 mole % when calculated in terms of $Sb_2O_3$, MgO and NiO, respectively.

3. The metal oxide varistor according to claim 1, wherein said sintered body is reheated at a temperature of about 700° to about 870° C.

4. The metal oxide varistor according to claim 1, wherein said non-diffusible electrode is a paste electrode baked at a temperature such that the diffusion of frit components therein into said sintered body does not occur.

5. The metal oxide varistor according to claim 1, wherein said non-diffusible electrode is an Al flame-spray coated electrode.

6. The metal oxide varistor according to claim 1, wherein said non-diffusible electrode is an Al vapor-deposited electrode.

7. The metal oxide varistor according to claim 1, wherein said non-diffusible electrode is an Al sputtered electrode.

8. The metal oxide varistor according to claim 1, wherein said non-diffusible electrode is a Ni electroless-plated electrode.

9. A method for forming a metal oxide varistor, comprising the steps of:

(a) preparing a sintered body containing (a) ZnO as a principal component, (b) Bi, Co and Mn each in amounts of about 0.05 to about 2 mole %, when calculated in terms of $Bi_2O_3$, $C_2O_3$ and $MnO_2$, respectively, and (c) at least one selected from Al, In and Ga in amounts of about $1\times10^{-4}$ to about $3\times10^{-2}$ mole %, when calculated in terms of $Al_2O_3$, $In_2O_3$ and $Ga_2O_3$, respectively;

(b) after step (a), reheating said sintered body only once at a temperature of about 700° to about 900° C., and (c) after said reheating, providing on said sintered body a non-diffusible electrode.

10. A method according to claim 9, wherein said non-diffusible electrode is provided on said sintered body by one selected from the group consisting of baking at a temperature such that diffusion of frit components into said sintered body does not occur, flame-spraying, sputtering, and electroless-plating.

* * * * *